(12) United States Patent
Naito

(10) Patent No.: US 7,427,352 B2
(45) Date of Patent: Sep. 23, 2008

(54) FLUID PURIFIER HAVING MAGNETIC FIELD GENERATION

(75) Inventor: Harusuke Naito, Oneonta, NY (US)

(73) Assignee: D20 LLC, Oneonta, NY (US)

(*) Notice: Subject to any disclaimer, the term of this patent is extended or adjusted under 35 U.S.C. 154(b) by 518 days.

(21) Appl. No.: 10/959,717

(22) Filed: Oct. 6, 2004

(65) Prior Publication Data
US 2005/0126975 A1   Jun. 16, 2005

Related U.S. Application Data

(63) Continuation-in-part of application No. 10/736,091, filed on Dec. 15, 2003, now abandoned.

(51) Int. Cl.
*C02F 1/48* (2006.01)
(52) U.S. Cl. .................. 210/223; 210/222; 210/266; 210/284; 210/449; 210/502.1
(58) Field of Classification Search .............. 210/695, 210/222, 223, 266, 284, 449, 502.01
See application file for complete search history.

(56) References Cited

U.S. PATENT DOCUMENTS

| | | | |
|---|---|---|---|
| 3,539,509 A | 11/1970 | Heitmann et al. | |
| 3,951,807 A | 4/1976 | Sanderson | |
| 4,146,479 A | 3/1979 | Brown | |
| 4,216,092 A | 8/1980 | Shalhoob et al. | |
| 4,278,549 A | 7/1981 | Abrams et al. | |
| 4,537,181 A | 8/1985 | Shalhoob et al. | |
| 4,662,314 A | 5/1987 | Moore, Jr. | |
| 4,904,381 A | 2/1990 | Urakami | |

(Continued)

FOREIGN PATENT DOCUMENTS

JP    61-216793 A    9/1986

(Continued)

OTHER PUBLICATIONS

"Notification of Transmittal of the International Search Report and the Written Opinion of the International Searching Authority" in PCT/US2004/039553.

(Continued)

*Primary Examiner*—David A Reifsnyder
(74) *Attorney, Agent, or Firm*—Cook Alex Ltd.

(57) ABSTRACT

A fluid purifier includes a filter having a chamber of reduced cross section formed either between an inner wall and an outer wall or within the inner wall. A ceramic layer of granular ceramic particles and at least a pair of magnetic layers each comprising an annular magnet and magnetite pieces are provided above or below the ceramic layer in the chamber. The annular magnets are arranged in such a way that the same polarities of adjacent annular magnets are facing each other, and the direction of the magnetic lines of force is parallel to the direction of flow of the fluid. Fluid molecules are activated while passing through the magnetic field produced by the magnetic layers of annular magnets and magnetite pieces which are magnetized by the annular magnets. In other embodiments the magnets may be differently and irregularly shaped magnet pieces, magnetite pieces may also be present and the magnet pieces and/or the magnetite pieces may be coated with the ceramic.

40 Claims, 4 Drawing Sheets

U.S. PATENT DOCUMENTS

| | | |
|---|---|---|
| 5,094,742 A | 3/1992 | Shalhoob |
| 5,161,512 A | 11/1992 | Adam et al. |
| 5,348,050 A | 9/1994 | Ashton |
| 5,468,378 A | 11/1995 | Barreiro |
| 5,534,156 A | 7/1996 | Sanderson |
| 5,628,900 A | 5/1997 | Naito |
| 5,637,226 A | 6/1997 | Adam et al. |
| 5,656,171 A | 8/1997 | Strachwitz |
| 5,716,520 A | 2/1998 | Mason |
| 5,753,124 A | 5/1998 | Bogatin et al. |
| 5,758,369 A | 6/1998 | Takahashi et al. |
| 5,795,471 A | 8/1998 | Naito |
| 5,866,010 A | 2/1999 | Bogatin et al. |
| 6,221,245 B1 | 4/2001 | Colburn |
| 6,277,275 B1 | 8/2001 | Yoshibusa et al. |
| 6,290,845 B1 | 9/2001 | Brane et al. |
| 6,394,075 B2 | 5/2002 | Castaldini |
| 2001/0006161 A1 | 7/2001 | Tulchinsky |
| 2002/0185418 A1 | 12/2002 | Harides et al. |
| 2002/0185437 A1 | 12/2002 | Harides et al. |
| 2003/0168393 A1 | 9/2003 | Tsunematsu |

FOREIGN PATENT DOCUMENTS

| | | |
|---|---|---|
| JP | 10-151469 | 6/1988 |
| JP | 09-248561 | 9/1997 |
| JP | 10-043079 | 2/1998 |
| JP | 11-028470 | 2/1999 |
| JP | 11-057735 | 3/1999 |
| JP | 11-309461 | 11/1999 |
| JP | 2000-107765 | 4/2000 |
| JP | 2000-317443 | 11/2000 |
| JP | 2002-192171 | 7/2002 |
| JP | 2002-263655 | 9/2002 |
| JP | 2003-214266 | 7/2003 |
| JP | 2003-269268 | 9/2003 |

OTHER PUBLICATIONS

Patent Abstracts of Japan vol. 11, No. 53 (C-404), Feb. 19, 1987 & JP 61 216793 A (Tamako Shimada), Sep. 26, 1986 abstract.

"Notification of the First Office Action" in Chinese Application No. 200480037408.0, mailed Dec. 7, 2007.

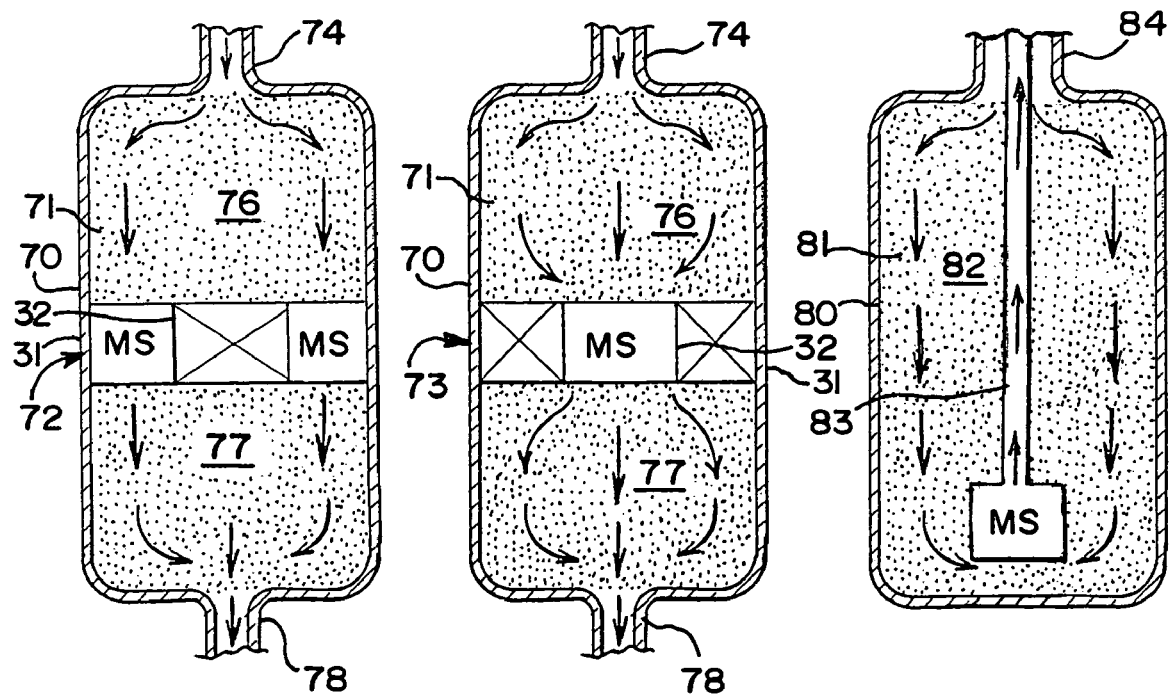
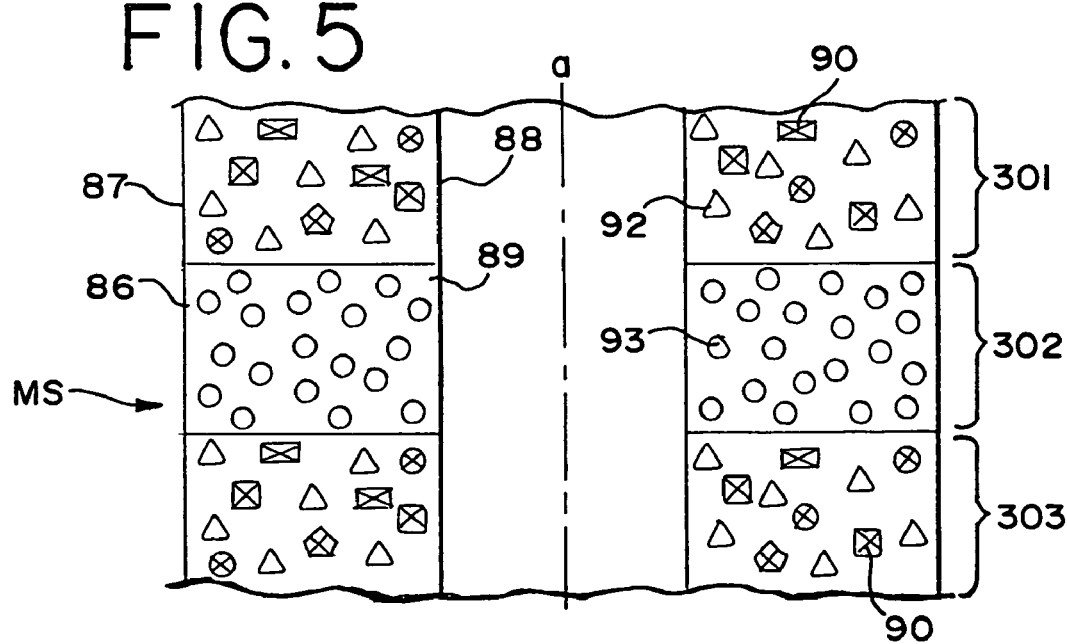

US 7,427,352 B2

FLUID PURIFIER HAVING MAGNETIC FIELD GENERATION

RELATED APPLICATION

This application is a continuation-in-pad of application Ser. No. 10/736,091, filed Dec. 15, 2003, now abandoned.

BACKGROUND OF THE INVENTION

This invention relates to a purifier for fluids and, more particularly, to a water purifier having a magnetic field generation device such as a permanent magnet or magnet pieces.

Known in the art of devices for purifying tap water are devices which utilize granular activated carbon, etc. to remove residual chlorine and other impurities in the tap water. Also known are devices which have an additional function of adjusting the water quality such as pH by electrolytic treatment or by using an ion exchange resin. Also recently developed are devices which utilize infrared radiation or a magnetization treatment to activate water molecules.

U.S. Pat. No. 5,628,900 discloses a water purifier including a filter having a cylindrical housing formed with a water inlet at one end and a water outlet on the other end and containing a granular activated carbon layer and a ceramic layer comprising granular ceramic, a magnetite layer comprising broken pieces of magnetite in a layer and provided at least above or below the ceramic layer, and annular magnets provided above and below the ceramic layer in such a manner that these annular magnets coincide with each other in the sense of magnetic lines of force and that the direction of the magnetic lines of force are parallel to the direction of flow of water. Water molecules are activated while passing through the magnetic field produced by the annular magnets and the magnetite layers which are magnetized by the annular magnets.

It is an object of the present invention to provide an improved purifier for fluids, such as water, which is capable of applying a magnetic field to the fluid to be treated more effectively than the above described prior art water purifier and thereby more effectively removing contaminants in the fluid to be treated.

SUMMARY OF THE INVENTION

In the present invention it has been found that the effectiveness of a magnetization treatment to activate molecules of fluid, such as water, depends on two major factors—how effective the fluid flow is through the magnetic field and the speed of fluid flow.

An annular magnet with or without a certain amount of magnetite forms a magnetic layer having a fixed strength of the magnetic field. The density of the magnetic field depends on the cross-section of the magnetic layer—the larger the cross section, the lower the density of the magnetic field. Vise versa, the smaller the cross section, the higher the density of the magnetic field.

For a fixed strength of the magnetic field of a magnetic layer—the density of the magnetic field is inversely proportional to the cross-section of the magnetic layer.

The effectiveness of a magnetization treatment to activate molecules of fluid, such as water, is proportional to the density of the magnetic field.

For a fixed fluid flow rate, the larger the cross section of the fluid flow, the lower the speed of the fluid flow. Vice versa, the smaller the cross-section of the fluid flow, the higher the speed of the fluid flow.

For a fixed fluid flow rate—the speed of the fluid flow is inversely proportional to the cross-section of the fluid flow.

These may be expressed by the formula $E \propto 1/C^2$ Where:

E is effectiveness of a magnetization treatment, and

C is cross section of the magnetic layer.

The effectiveness of a magnetization treatment to activate the molecules of the fluid is also proportional to the speed of the fluid flow.

For an annular magnet with or without a certain amount of magnetite which forms a magnetic layer, if the cross section of the magnetic layer is reduced by half such that the density of the magnetic field is double and the speed of fluid flow is double, then the effectiveness of a magnetization treatment to activate the molecules of fluid is four (4) times better.

It has also been found in the present invention that the effectiveness of the fluid treatment such as water may be maximized by providing magnet pieces with or without magnetite pieces in the magnetic section of the water purifier and in which the magnet and/or magnetite pieces are coated with a ceramic.

BRIEF DESCRIPTION OF THE DRAWINGS

In the accompanying drawings,

FIGS. 4A, 4B and 4C are vertical cross-sectional views showing several preferred embodiments of fluid purifiers of the present invention in treatment systems also including other fluid treatment media;

FIG. 5 is a broken vertical cross-sectional view similar to FIG. 1, but showing a second preferred embodiment of a magnetic section of a fluid purifier of the present invention;

DESCRIPTION OF PREFERRED EMBODIMENTS

Figure 1:
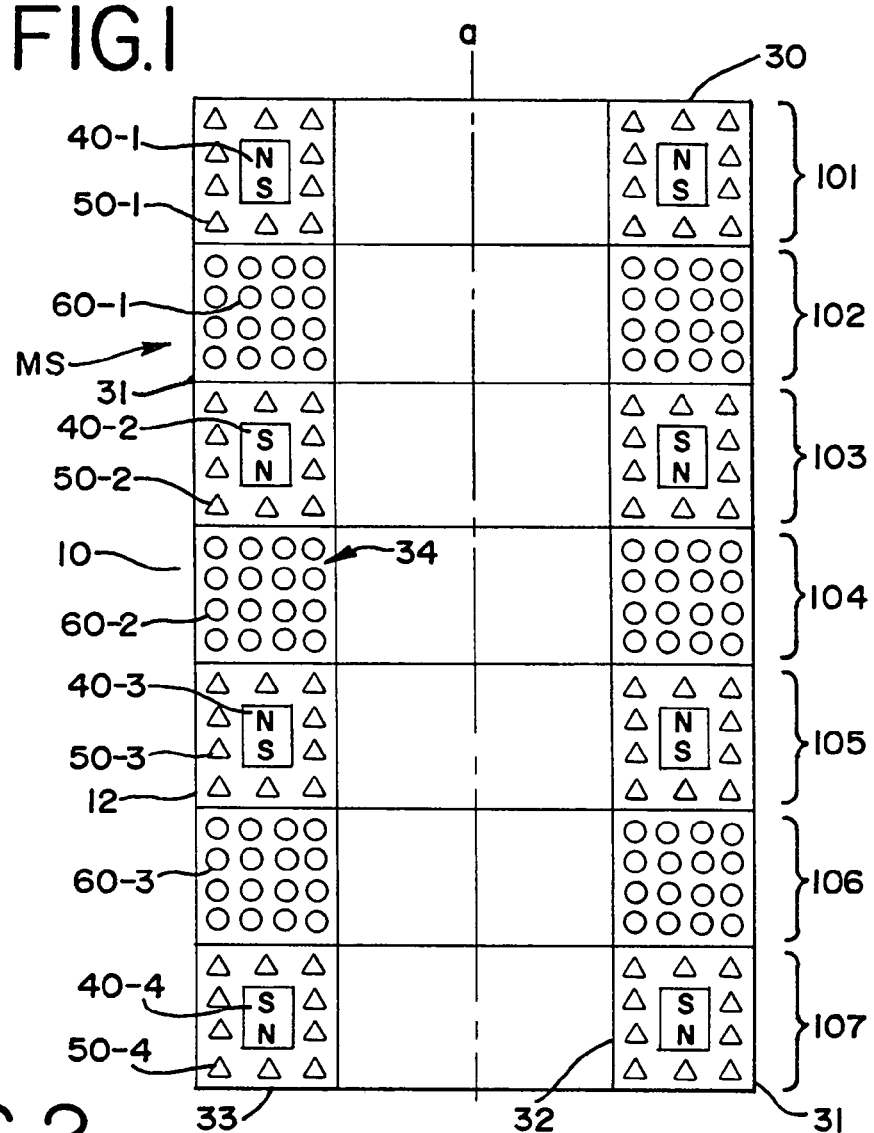
FIG. 1 is a vertical cross-sectional view showing a preferred embodiment of a magnetic section of a fluid purifier of the present invention.

FIG. 1 is the vertical cross-sectional view of a preferred embodiment of magnetic section MS of fluid purifier which magnetic section includes a magnetic field generation device in accordance with the present invention. The magnetic section MS of the fluid purifier in FIG. 1 includes a generally cylindrical housing 10, having a longitudinal axis a, an outer wall 31, an inner wall 32 and a bottom 33 which define a chamber 34 therein. A first magnetic layer 101, a second ceramic layer 102, a third magnetic layer 103, a fourth ceramic layer 104, a fifth magnetic layer 105, a sixth ceramic layer 106 and seventh magnetic layer 107 are positioned within the chamber 34.

In the embodiment of the invention shown in FIG. 1 each magnetic layer 101, 103, 105 or 107 includes an annular magnet 40-1, 40-2, 40-3 and/or 40-4 and broken pieces of magnetite 50-1, 50-2, 50-3 and/or 50-4 respectively. The annular magnets are arranged in such a way that the same polarity of the adjacent annular magnets are facing each other. As illustrated in FIG. 1, the S pole of annular magnet 40-1 is facing the S pole of annular magnet 40-2, the N pole of annular magnet 40-2 is facing the N pole of annular magnet 40-3, and the S pole of annular magnet 40-3 is facing the S pole of annular magnet 40-4.

Each ceramic layer 102, 104 and/or 106 is preferably non-magnetic and preferably includes granular ceramic particles 60-1, 60-2 and 60-3 respectively. However, in the alternative, the ceramic layers may be formed in a non-granular block form with pores or passages for the passage of water therethrough and/or may be formed of a non-ceramic, non-magnetic material without departing from the invention. The ceramic material may be of the kind disclosed in my prior U.S. Pat. No. 5,628,900.

Fluid such as water flows from top 30 in the magnetic section MS shown in FIG. 1, through layers 101, 102, 103, 104, 105, 106 and 107, and then exits through bottom 33. Vice versa, fluid can also flow in the reverse direction from the bottom 33 through layers 107, 106, 105, 104, 103, 102 and 101, and then exit through top 30.

Two pairs of magnetic layers are shown in FIG. 1. However, the arrangement is not limited to two pairs of magnetic layers and can be any number of magnetic layers as desired. Likewise, the number of ceramic layers can also be varied.

Figure 2:
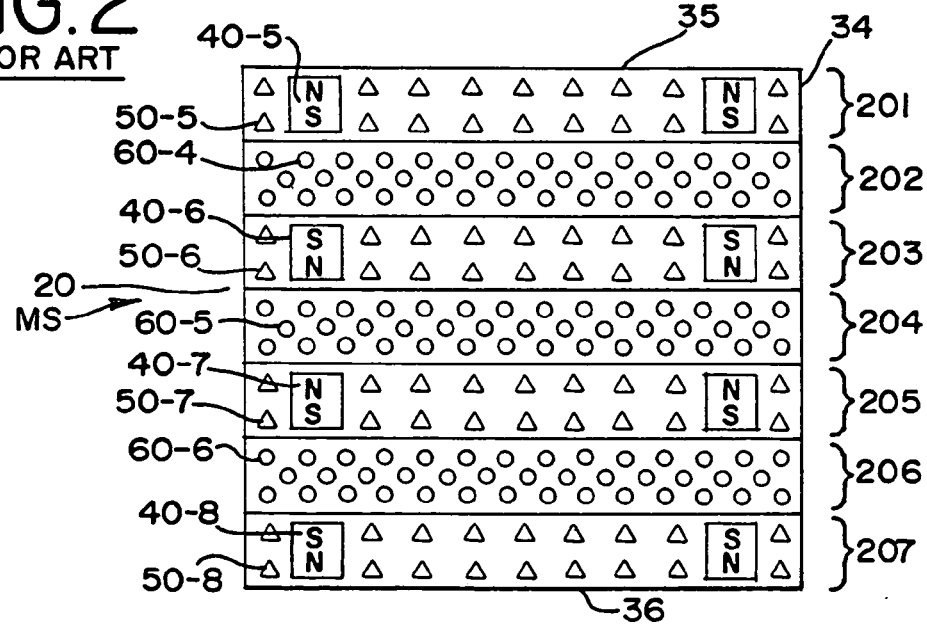
FIG. 2 is a vertical cross-sectional view showing a fluid purifier of the prior art.

FIG. 2 is a vertical cross-sectional view of the magnetic section MS of a prior art fluid purifier which also includes a magnetic field generation device. The magnetic section MS in FIG. 2 includes a housing 20, a first magnetic layer 201, a second ceramic layer 202, a third magnetic layer 203, a fourth ceramic layer 204, a fifth magnetic layer 205, a sixth ceramic layer 206 and a seventh magnetic layer 207. The housing 20 includes an outer wall 34 and a bottom 36.

Each magnetic layer 201, 203, 205 or 207 includes an annular magnet 40-5, 40-6, 40-7 and/or 40-8 and broken pieces of magnetite 50-5, 50-6, 50-7 and/or 50-8 respectively. As in FIG. 1, the annular magnets are arranged in such a way that the same polarity of the adjacent annular magnets are facing each other. As illustrated in FIG. 2, the S pole of annular magnet 40-5 is facing the S pole of annular magnet 40-6, the N pole of annular magnet 40-6 is facing the N pole of annular magnet 40-7, and the S pole of annular magnet 40-7 is facing the S pole of annular magnet 40-8.

Each preferably non-magnetic ceramic layer 202, 204 and/or 206 includes granular ceramic particles 60-4, 60-5 and/or 60-6 respectively.

Fluid such as water flows from the top 35 of the housing through layers 201, 202, 203, 204, 205, 206 and 207, and then exits through bottom 36. Vice versa, fluid can also flow in the reverse direction from bottom 36 through layers 207, 206, 205, 204, 203, 202 and 201, and then exits through top 35.

The annular magnets 40-1, 40-2, 40-3, 40-4, 40-5, 40-6, 40-7 and 40-8 are the same in FIGS. 1 and 2. The amount of magnetite particles 50-1, 50-2, 50-3, 50-4, 50-5, 50-6, 50-7 and 50-8 are also the same. However, the cross-sectional area of chamber 10 is half of that of housing 20.

For the same fluid flow passing through chamber 10 and housing 20, the speed of the fluid flow passing through chamber 10 is double the speed of fluid flow passing through housing 20. Due to each magnetic layer 101, 103, 105, 107, 201, 203, 205 and 207 having the same magnetic field and the same amount of magnetite pieces 50-1, 50-2, 50-3, 50-4, 50-5, 50-6, 50-7 and 50-8, and the cross-section of chamber 10 being half the cross-section of housing 20, the density of the magnetic field of the magnetic layers is double the density of the magnetic field of magnetic layers 201, 203, 205 and 207.

Although the magnetic layers 101, 103, 105 and 107 of the chamber 10 are otherwise exactly the same as the magnetic layers of 201, 203, 205 and 207 of housing 20, the effectiveness of the magnetization treatment of the invention as shown in FIG. 1 to activate water molecules is four times better that of the prior art as shown in FIG. 2.

Figure 3:
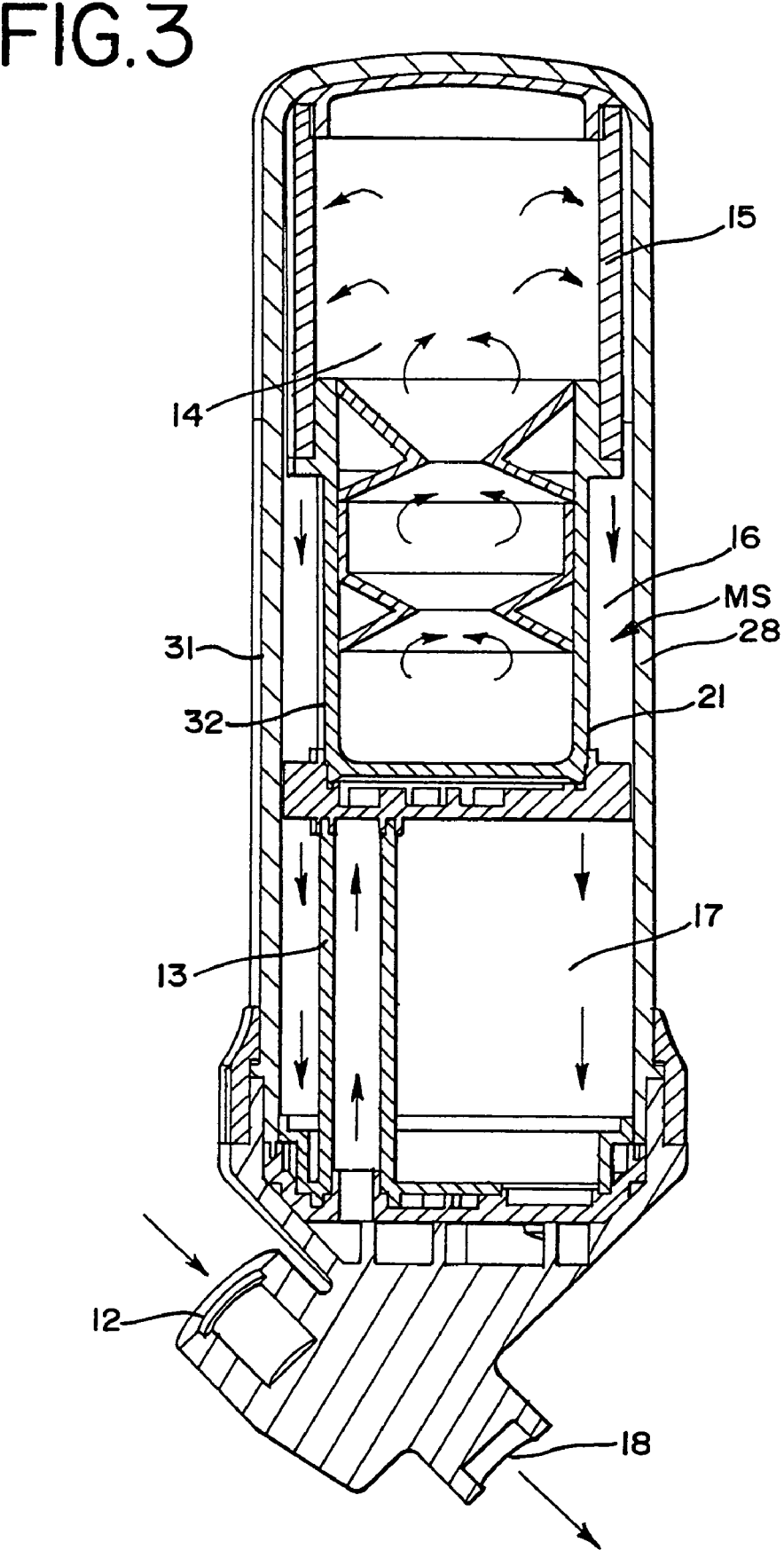
FIG. 3 is a vertical cross-sectional view showing a preferred embodiment of fluid purifier of the present invention as a shower filter for water.

The magnetic section MS of the fluid purifier of the invention is shown incorporated in a preferred shower filter for water as seen in FIG. 3. In FIG. 3 water flows through an inlet 12, tube 13, chamber 14, sediment filter 15, chamber 16, housing 17 and exits through outlet 18 as shown by the arrows. The chamber 16 of the magnetic section MS with outer wall 28 of for example a diameter of 2.2 inches (3.8 sq. in.) and inner wall 21 of for example a diameter 1.7 inches (2.27 sq. in.) the chamber 16 will have a cross-section of 1.53 square inches (3.8 sq. in–2.27 sq. in). The housing 17 with outer wall 28 of also for example a diameter of 2.2 inches will result in a cross-section of the housing 17 of 3.8 square inches. If the same magnetic field layer is put in chamber 16 instead of housing 17, the effectiveness of the magnetization treatment in chamber 16 is 6.17 times (3.8×3.8/1.53/1.53) better than that in housing 17.

It will be appreciated that although the water purifier has been shown in FIG. 3 as a shower filter, that the purifier may constitute or be part of any one of a variety of water treatment filters or assemblies other than shower filters.

Although pieces or particles of magnetite are shown and described as forming the magnetic layers together with the annular magnets, the magnetite may be eliminated and just the annular magnets relied upon to provide the magnetism in the magnetic layers without departing from the present invention.

As shown in FIGS. 4A-4C the fluid purifier housings and arrangement of contents may take various forms other than the shower filter shown in FIG. 3. For example, the housing 70 shown in FIGS. 4A and 4B may comprise a single chamber 71 which is separated by an intermediate magnetic treatment zone 72 in FIG. 4A or 73 in FIG. 4B. The chamber 71 above and below the magnetic treatment zones 72 or 73 preferably contains fluid treatment media different from that employed in the magnetic treatment. When the fluid being treated is water, such treatment media may include sand, bakuhan, taicho, carbon and/or finely divided metals such as alloys of copper and zinc as described in U.S. Pat. No. 5,415,770. It will be appreciated that the medium 76 in the chamber 71 above the zones 72 or 73 may be the same or different than the medium 77 in the chamber below the zones.

The magnetic treatment zone 72 as shown in FIG. 4A is annular in nature such as shown in FIGS. 1 and 5-8 in which the center is blocked from fluid flow so that the fluid flow is concentrated in the annular magnetic section MS about the perimeter of the magnetic treatment zone and between the outer wall 31 and inner wall 32, to achieve the magnetic field density and increased speed of fluid flow as previously described.

Comparable increased field densities and speed of fluid flow are also achieved in the magnetic treatment zone 73 arrangement of FIG. 4B in which the water flow through the magnetic treatment zone 73 is blocked about the annular perimeter between the outer wall 31 and inner wall 32, and is concentrated through the magnetic section MS in the center of the zone and within the inner wall 32.

Thus, it will be seen that the fluid to be treated will enter the inlet 74 of housing 70 in FIS. 4A and 4B, will pass through the water treatment medium 76 in the upper part of chamber 71, will pass through the magnetic treatment zone 72 and its magnetic section MS, through the treatment medium 77 in the lower portion of the chamber 71, and will exit the housing 70 via the outlet 78. It will also be appreciated that the fluid flow can be reversed and flow from the bottom of the housing 70 to the top.

The fluid purifier shown in FIG. 4C also includes a housing 80 defining a chamber 81 therein for containing a treatment medium 82 which, when water is being purified, may be anyone of the various treatment media previously described in the description of FIGS. 4A and 4B. In contrast to the fluid purifier shown in FIGS. 4A and 4B, the magnetic section MS in FIG. 4C is positioned at the discharge from the purifier for example at the end of a discharge riser 83 after the fluid has been introduced to the housing 80 through the inlet 84 and fully treated by the treatment medium 82. Again, the magnetic section MS is of reduced diameter relative to the diameter of the housing 80 and treatment medium 82. Thus, as in FIGS. 4A and 4B, the speed of flow of the fluid to be treated is preferably low through the treatment medium 82 to maximize contact time with that treatment medium, and then is substantially increased as is the density of the magnetic field as the fluid passes through the reduced diameter magnetic section MS.

In FIG. 5 a vertical cross-sectional view of a second preferred embodiment of magnetic section MS of fluid purifier is shown which includes a generally cylindrical housing 86, having a longitudinal axis a, and an outer wall 87 and inner wall 88 which define a chamber 89 therein. As in FIGS. 1 and 4A, the chamber 89 is generally annular for the reasons described in the discussion of FIG. 1, e.g. increased speed of fluid flow and density of magnetic field.

Also as in the embodiment shown in FIG. 1, a first magnetic layer 301, a second ceramic layer 302, a third magnetic layer 303, etc. are positioned within the chamber 89. The ceramic layer(s) 302 is substantially the same as the ceramic layers 102, 104 and 106 in FIG. 1. However, unlike the FIG. 1 embodiment, magnetism in the magnetic layers 301, 303 in FIG. 5 which are separated by the ceramic layer(s) 302, is provided by irregularly and differently shaped magnet pieces 90 which are disbursed throughout the magnetic layers 301 and 303 together with magnetite pieces 92. Such dispersion of the magnet pieces 90 within the layers 301 and 303 permit the magnetic field across the cross-section of the chamber 89 to be much more uniformly and evenly distributed as compared to the annular solid magnets 40-1, 40-2, 40-3 and 40-4 in the embodiment shown in FIG. 1. In FIG. 1 the magnetic field density is quite strong close to the magnet, but rapidly diminishes in a lateral direction away from the magnet.

Figure 6:
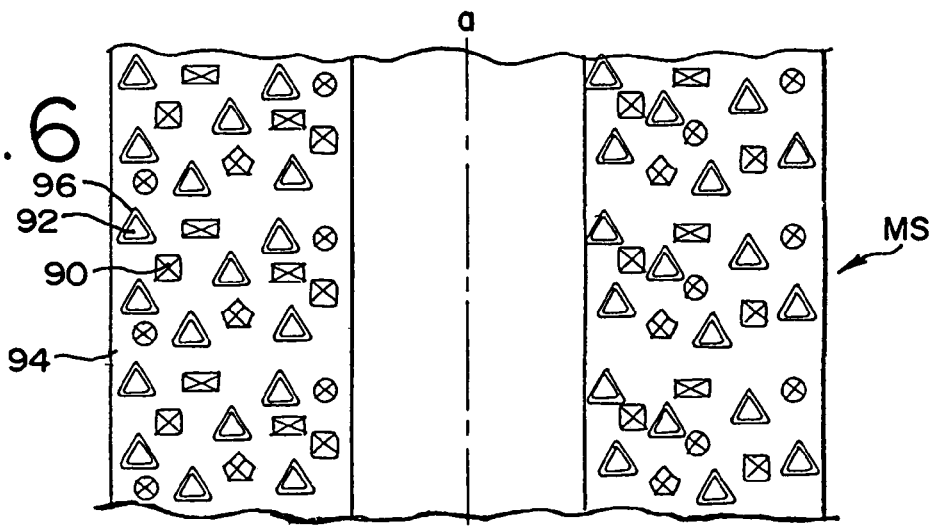
FIG. 6 is a broken vertical cross-sectional view similar to FIG. 5, but showing a third preferred embodiment of a magnetic section of a fluid purifier of the present invention.
Figure 7:
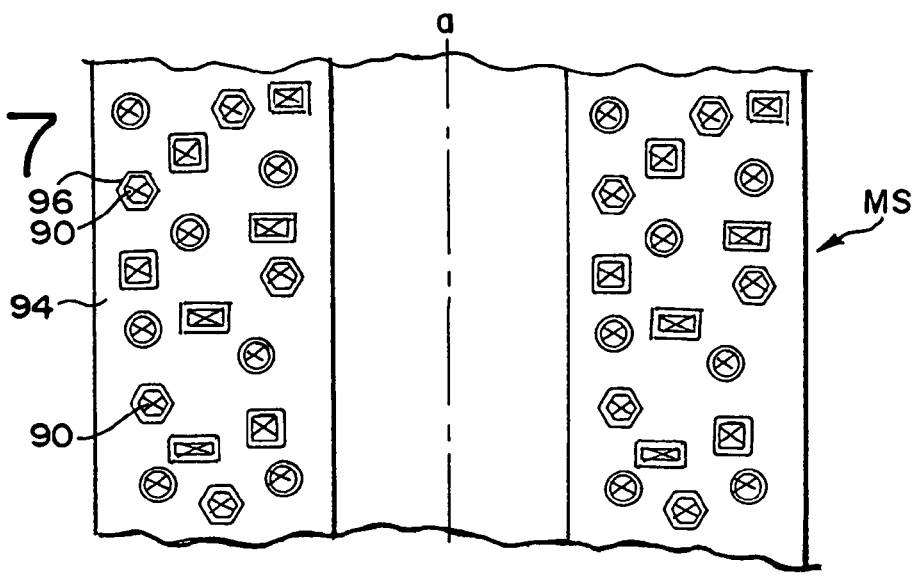
FIG. 7 is a broken vertical cross-sectional view similar to FIG. 6, but showing a fourth preferred embodiment of a magnetic section of a fluid purifier of the present invention.
Figure 8:
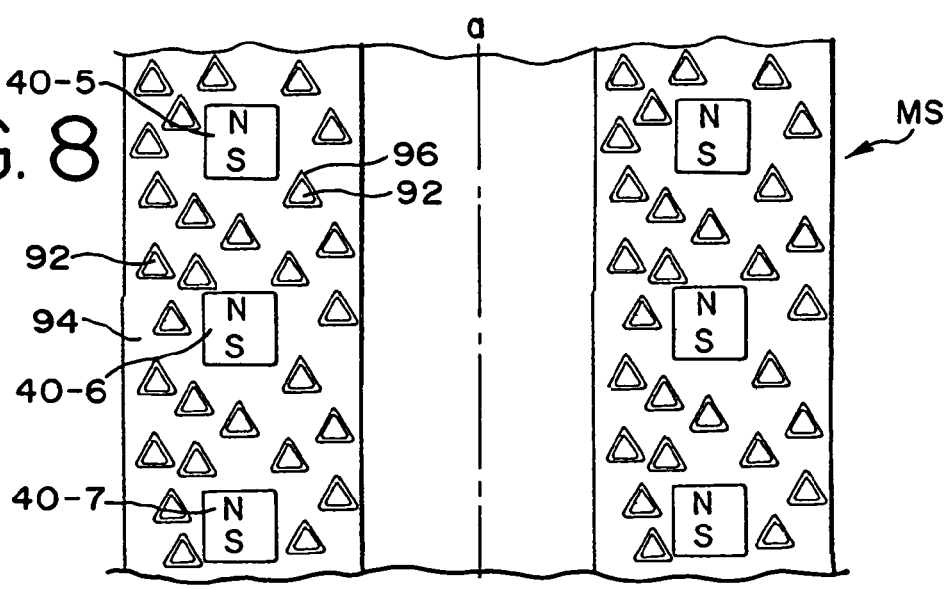
FIG. 8 is a broken vertical cross-sectional view similar to FIG. 7, but showing a fifth preferred embodiment of a magnetic section of a fluid purifier of the present invention.

FIGS. 6, 7 and 8 are also vertical cross-sectional views of three additional preferred embodiments of magnetic sections MS of a fluid purifier. The embodiments in FIGS. 6-8 differ from those shown in FIGS. 1 and 5 in that the components in the magnetic section are not layered in FIGS. 6-8. Instead, the various components are distributed relatively uniformly over the height of the chambers 94 and the ceramic layers are eliminated. Instead the ceramic is present in the form of a coating 96 on one or more of the components.

In FIG. 6 the chamber 94 contains relatively uniformly mixed but differently shaped and irregular magnet pieces 90 as in FIG. 5, and magnetite pieces 92. However, the magnetite pieces in FIG. 6 have the ceramic coating 96 coated thereon.

In the embodiment shown in FIG. 7 the magnetite pieces have been eliminated, but the differently shaped and irregular magnet pieces 90 have the ceramic coating 96 coated thereon.

Coating the magnetite pieces 92 in FIG. 6 and magnet pieces 90 in FIG. 7 with the ceramic coating 96 has the advantage that it protects the pieces against rust. Such ceramic coating also places the ceramic which has somewhat of a catalytic effect closer to the magnetic action.

The magnet pieces 90 are preferably of different and irregular shape to prevent them from attracting and attaching to each other to the extent that they might stick together and block the flow of water. Because they are of different shape and are irregular, even if they do stick together, there are numerous pores and voids between the combined structure to permit the passage of water through the agglomerated structure and in close proximity to the magnetic fields of the respective pieces for enhanced magnetic treatment.

In the embodiment of magnetic section MS shown in FIG. 8 the magnetite pieces 92 are again coated with a ceramic coating 96 as in FIG. 6, but the magnet pieces 90 have been replaced at the various levels with annular solid magnets 40-5, 40-6 and 40-7 similar to the embodiment shown in FIG. 1.

As previously mentioned the embodiments shown in FIGS. 6-8 essentially eliminate the need for discrete levels or layers of treatment materials in the magnetic section MS. This facilitates both the ease of assembly as well as replacement of materials.

Although the magnetic sections MS as shown in FIGS. 5-8 are depicted as annular in form as in FIGS. 1 and 4A, it will be appreciated that they may also take the center form shown in FIG. 4B.

It will also be understood that the preferred embodiments of the present invention as have been described are merely illustrative of the principles of the present invention. Numerous modifications may be made by those skilled in the art without departing from the true spirit and scope of the invention.

What is claimed is:

1. A fluid purifier comprising:
   a housing having an inner wall, an outer wall of greater transverse dimension than said inner wall, and a bottom which define a chamber between said inner wall and said outer wall;
   the housing having a central longitudinal axis and a pair of opposite ends spaced along said axis, said housing being formed with a fluid inlet at said one end and a fluid outlet at said other end to allow a flow of fluid through said chamber in a direction parallel to said axis;
   at least one non-magnetic layer disposed in said chamber, said layer extending perpendicularly across said chamber relative to said axis; and
   at least one magnetic layer disposed in said chamber, said magnetic layer comprising a magnet, said magnetic layer extending perpendicularly across said chamber relative to said axis.

2. The fluid purifier of claim 1, wherein said non-magnetic layer comprises ceramic.

3. The fluid purifier of claim 2, wherein said ceramic comprises granular ceramic particles.

4. The fluid purifier of claim 1, wherein said non-magnetic layer comprises granular particles.

5. The fluid purifier of claim 1, wherein said magnetic layer includes magnetite pieces therein.

6. The fluid purifier of claim 5, wherein said non-magnetic layer comprises granular ceramic particles.

7. The fluid purifier of claim 5, comprising at least a pair of magnetic layers disposed in said chamber, one of said magnetic layers being disposed between said fluid inlet and said ceramic layer and the other said magnetic layer being disposed between said ceramic layer and said fluid outlet.

8. The fluid purifier of claim 7, wherein the respective magnets of said magnetic layers generate magnetic lines of force which are parallel to said central longitudinal axis and the direction of said flow of the fluid.

9. The fluid purifier of claim 8, wherein the respective magnets of adjacent magnetic layers are positioned such that the same polarities of the adjacent annular magnets are facing each other and said magnetic lines of force pass through said magnetic layers and thereby magnetize said magnetite pieces.

10. The fluid purifier of claim 9, wherein the fluid purifier is a shower filter.

11. The fluid purifier of claim 8, wherein the chamber is defined by said inner walk and said outer wall, and said magnet is annular.

12. The fluid purifier of claim 7, wherein the respective magnets of adjacent magnetic layers are positioned such that the same polarities of the adjacent magnets are facing each other.

13. The fluid purifier of claim 7, wherein the fluid purifier is a shower filter.

14. The fluid purifier of claim 5, wherein the fluid purifier is a shower filter.

15. The fluid purifier of claim 1, including a filter adjacent said inlet.

16. The fluid purifier of claim 15, wherein said magnetic layer is disposed between said filter and said ceramic layer.

17. The fluid purifier of claim 1, including a filter adjacent said inlet and wherein said magnetic layer is disposed between said filter and said non-magnetic layer.

18. The fluid purifier of claim 1, comprising at least a pair of magnetic layers disposed in said chamber, one of said magnetic layers being disposed between said fluid inlet and said non-magnetic layer and the other said magnetic layer being disposed between said non-magnetic layer and said fluid outlet.

19. The fluid purifier of claim 18, wherein the respective magnets of said magnetic layers generate magnetic lines of force which are parallel to said central longitudinal axis and the direction of said flow of the fluid.

20. The fluid purifier of claim 19, wherein the respective magnets of adjacent magnetic layers are positioned such that the same polarities of the adjacent magnets are facing each other and said magnetic lines of force pass through said magnetic layers.

21. The fluid purifier of claim 20, wherein the chamber is defined by said inner wall and said outer wall, and said magnet is annular.

22. The fluid purifier of claim 18, wherein the respective magnets of adjacent magnetic layers are positioned such that the same polarities of the adjacent magnets are facing each other.

23. The fluid purifier of claim 1, wherein the fluid purifier is a shower filter.

24. The fluid purifier of claim 1, wherein the chamber is defined by said inner wall and said outer wall, and said magnet is annular.

25. A fluid purifier comprising:
a housing having an inner wall, an outer wall of greater transverse dimension than said inner wall, and a bottom which define a chamber therebetween in the housing;
the housing having a central longitudinal axis and a pair of opposite ends spaced along said axis, said housing being formed with a fluid inlet at said one end and a fluid outlet at said other end to allow a flow of fluid through said chamber in a direction parallel to said axis;
a filter disposed adjacent said inlet;
at least one ceramic layer disposed in said chamber between said filter and said outlet, said ceramic layer comprising granular ceramic particles and extending perpendicularly across said chamber relative to said axis;
at least one pair of magnetic layers disposed in said chamber, each said magnetic layer comprising an annular magnet and magnetite pieces extending perpendicularly across said chamber relative to said axis, one of said magnetic layers being disposed between said filter and said ceramic layer, and the other of said magnetic layers being disposed between said ceramic layer and said outlet; and
at least a pair of said annular magnets disposed in said chamber and coaxially surrounding said axis, wherein one of said magnets is located between said ceramic layer and said inlet and the other of said magnets is located between said ceramic layer and said outlet such that said annular magnets generate magnetic lines of force which are parallel to said central longitudinal axis and in the direction of said flow of fluid, said annular magnets being located in such a mariner that the same polarities of adjacent ones of said annular magnets are facing each other, and said magnetic lines of force pass through said magnetic layers and thereby magnetize said magnetite particles in said magnetic layers.

26. The fluid purifier of claim 25, wherein the fluid purifier is a shower filter.

27. A fluid purifier comprising:
a housing having a chamber therein;
an inlet adjacent one end of said housing, and an outlet adjacent another end of said housing to allow the flow of fluid through the chamber;
materials in said chamber through which said water flows; said materials comprising a ceramic and differently and irregularly shaped permanent magnet pieces.

28. The fluid purifier of claim 27, wherein said ceramic comprises ceramic particles, and said ceramic pieces are positioned in a first layer and said magnet pieces are positioned in a separate layer distinct from said first layer.

29. The fluid purifier of claim 28, wherein said housing has an inner wall, an outer wall of greater transverse dimension than said inner wall, and a bottom which define said chamber either between said inner wall and said outer wall or within said inner wall;
the housing having a central longitudinal axis and the fluid flows through said chamber and said ceramic and magnet pieces therein in a direction parallel to said axis; and
said materials in said chamber extend perpendicularly across said chamber relative to said axis.

30. The fluid purifier of claim 27, wherein said ceramic is coated onto said magnet pieces.

31. The fluid purifier of claim 30, wherein said housing has an inner wall, an outer wall of greater transverse dimension than said inner wall, and a bottom which define said chamber either between said inner wall and said outer wall or within said inner wall;
the housing having a central longitudinal axis and the water flows through said chamber and said ceramic and magnet and magnetite pieces therein in a direction parallel to said axis; and
said materials in said chamber extend perpendicularly across said chamber relative to said axis.

32. The fluid purifier of claim 27, wherein said materials include magnetite pieces.

33. The fluid purifier of claim 32, wherein said ceramic is coated onto at least one of said magnet pieces and/or said magnetite pieces.

34. The fluid purifier of claim 33, wherein said housing has an inner wall, an outer wall of greater transverse dimension than said inner wall, and a bottom which define said chamber either between said inner wall and said outer wall or within said inner wall;
   the housing having a central longitudinal axis and the fluid flows through said chamber and said ceramic and particles therein in a direction parallel to said axis; and
   said materials in said chamber extend perpendicularly across said chamber relative to said axis.

35. The fluid purifier of claim 27, wherein said housing has an inner wall, an outer wall of greater transverse dimension than said inner wall, and a bottom which define said chamber either between said inner wall and said outer wall or within said inner wall;
   the housing having a central longitudinal axis and the fluid flows though said chamber and said ceramic particles and magnet pieces therein in a direction parallel to said axis; and
   the materials in said chamber extend perpendicularly across said chamber relative to said axis.

36. A fluid purifier comprising:
   a housing having an inner wall, an outer wall of greater transverse dimension than said inner wall, and a bottom which defines a chamber between said inner wall and said outer wall;
   the housing having a central longitudinal axis and a pair of opposite ends spaced along said axis;
   an inlet adjacent one end of said housing, and an outlet adjacent another end of said housing to allow the flow of fluid through the chamber in a direction parallel to said axis;
   at least one magnet in said chamber past which the fluid flows; and
   a particulate material in said chamber through which said fluid flows; said particulate material comprising pieces of magnetite which have been coated with ceramic and which are adjacent said magnet.

37. The fluid purifier of claim 36, including a plurality of said magnets spaced from each other in the direction of the flow of the fluid and in said magnetite pieces coated with ceramic.

38. The fluid purifier of claim 36, wherein said housing has an inner wall, an outer wall of greater transverse dimension than said inner wall, and a bottom which defines said chamber either between said inner wall and said outer wall or within said inner wall;
   the housing having a central longitudinal axis and the fluid flows though said chamber and said ceramic coated magnetite pieces therein in a direction parallel to said axis;
   said ceramic coated magnetite pieces extending perpendicularly across said chamber relative to said axis.

39. A fluid purifier comprising:
   a housing having an inner wall, an outer wall of greater transverse dimension than said inner wall, and a bottom which define a chamber between said inner wall and said outer wall;
   the housing having a central longitudinal axis and a pair of opposite ends spaced along said axis, said housing being formed with a fluid inlet at said one end and a fluid outlet at said other end to allow a flow of fluid through said chamber in a direction parallel to said axis; and
   at least one magnetic layer disposed in said chamber, said magnetic layer comprising a magnetic field, said magnetic field extending perpendicularly across said chamber relative to said axis.

40. The fluid purifier of claim 39, wherein said magnetic layer includes a particulate medium with said magnetic field therein.

* * * * *